United States Patent [19]

Mooney

[11] Patent Number: 4,798,233

[45] Date of Patent: Jan. 17, 1989

[54] PORTABLE COMPRESSED AIR DELIVERY UNIT FOR TIRES WITH BUILT-IN ANTIFREEZE CAPABILITY

[76] Inventor: Brian J. Mooney, 210 W. Jefferson, Grand Ledge, Mich. 48837

[21] Appl. No.: 20,727

[22] Filed: Mar. 2, 1987

[51] Int. Cl.$^4$ ............................................. B65B 31/00
[52] U.S. Cl. ...................................... 141/38; 141/98; 141/231; 152/415
[58] Field of Search ...................... 141/37–67, 141/231–233, 1–12, 98, 104, 100; 152/415

[56] References Cited

U.S. PATENT DOCUMENTS

| | | | |
|---|---|---|---|
| 3,183,945 | 5/1965 | Edwards | 141/38 |
| 3,335,766 | 8/1967 | Winger | 141/38 |
| 3,448,779 | 6/1969 | Horwitt | 141/38 |
| 3,468,348 | 9/1969 | Sperberg | 141/1 |
| 3,727,651 | 4/1973 | Biever | 141/231 |
| 3,729,033 | 4/1973 | Bayerkohler | 141/231 |

*Primary Examiner*—Henry J. Recla
*Assistant Examiner*—Ernest G. Cusick
*Attorney, Agent, or Firm*—Miller, Morriss and Pappas

[57] ABSTRACT

A portable compressed air delivery unit for tires with a built-in antifreeze capability so as to prevent freezing of compressed air condensate in the tire air delivery tube and the tire-engaging compressed air valve assembly. The portable compressed air delivery unit consists of a portable support frame provided with an air compressor. A methyl alcohol supply tank is also provided on the support frame in operative engagement with and above the air compressor. The methyl alcohol supply tank is provided with an upwardly extending methyl alcohol supply tank air intake valve which is adapted to introduce intake air into the lower portion of the supply tank beneath the surface of the methyl alcohol contained herein. A methyl alcohol vapor outlet is provided in the upper portion of the methyl alcohol tank so as to make on demand delivery of methyl alcohol vapor to the air compressor through a methyl alcohol vapor delivery tube connected at one end to the methyl alcohol vapor outlet provided on the methyl alcohol supply tank and at the opposite end to the air compressor methyl alcohol vapor inlet provided on the compressor air intake assembly. A coin-operated timer unit is provided in operative engagement with the air compressor. Upon selective actuation of the air compressor by the coin-operated timer unit, the air compressor will draw in methyl alcohol vapor from the methyl alcohol supply tank and will deliver a compressed air methyl alcohol vapor mixture to a tire air delivery tube through the compressed air methyl alcohol vapor mixture outlet provided on the air compressor. The tire air delivery tube is provided with a tire-engaging compressed air valve assembly for selective engagement with a tire so as to deliver the compressed air methyl alcohol vapor thereto.

4 Claims, 2 Drawing Sheets

PORTABLE COMPRESSED AIR DELIVERY UNIT FOR TIRES WITH BUILT-IN ANTIFREEZE CAPABILITY

FIELD OF THE INVENTION

This invention relates to a portable compressed air delivery unit for tires with a built-in antifreeze capability. Further, this invention relates to a portable compressed air delivery unit which permits the introduction of a methyl alcohol vapor into the air compressor so that a mixture of methyl alcohol vapor and compressed air is delivered through the compressor outlet tube being serviced. The use of the methyl alcohol vapor and compressed air mixture in the outlet tube during freezing weather prevents the freezing of the compressed air condensation which normally occurs in the compressed air outlet delivery tube when compressed air is being delivered to a tire.

PRIOR ART

In the portable compressed air delivery units of the prior art, the advent of freezing weather causes the air condensation which normally occurs in the compressed air outlet delivery tube to freeze up thereby rendering the portable compressed air delivery unit inoperable. In more complicated compressed air delivery units, complicated and expensive heating systems are utilized to prevent freeze-up of compressed air transmission lines. However, no one has heretofore addressed the problem of the prevention of freeze-up of air condensation in the elongate flexible compressed air outlet delivery tubes during below freezing temperatures.

A need has thus existed for a simple, inexpensive method and means for easily preventing the freezing of air condensation in air compressor outlet delivery tubes of portable compressed air delivery units during below freezing weather.

A further need has existed for a portable air compressor compressed air delivery unit for tires whereby methyl alcohol vapor or other equivalent vapor having antifreeze capability is selectively automatically introduced into an air compressor so that a mixture of methyl alcohol vapor and compressed air is delivered to the flexible outlet tube for subsequent delivery to a tire without the freeze-up of normal air condensation during freezing weather.

Yet another need has existed for a portable air compressor compressed air delivery unit which prevents air condensation freeze-up in the compressed air outlet delivery tube without the need for ancillary expensive heater assemblies.

It is an object of this invention to provide a portable air compressor compressed air delivery unit for tires with a built-in antifreeze capability.

Another object of the invention is to provide a portable air compressor compressed air delivery unit for tires whereby methyl alcohol vapor is selectively automatically introduced into an air compressor so that a mixture of methyl alcohol vapor and compressed air is selectively delivered to the flexible outlet compressed air delivery tube with an antifreeze capability which prevents the freeze-up of normal air condensation within the tube during below freezing weather.

Other objects and advantages found in the construction of the invention will be apparent from a consideration of the following specification in connection with the appended claims and the accompanying drawings.

DESCRIPTION

Figure 1:
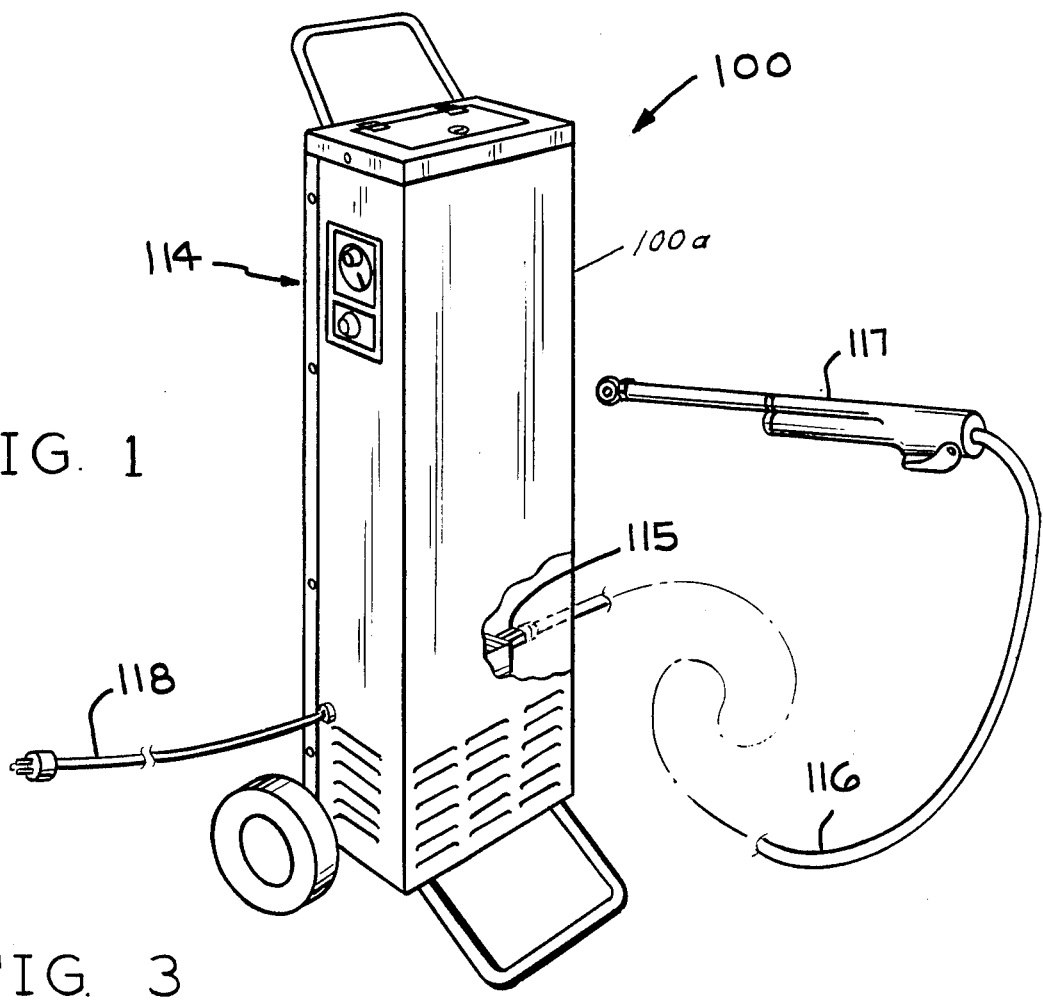
FIG. 1 is a front perspective view of the portable air compressor compressed air delivery unit for tires with a portion thereof broken away to show the flexible compressed air outlet delivery tube.
Figure 3:
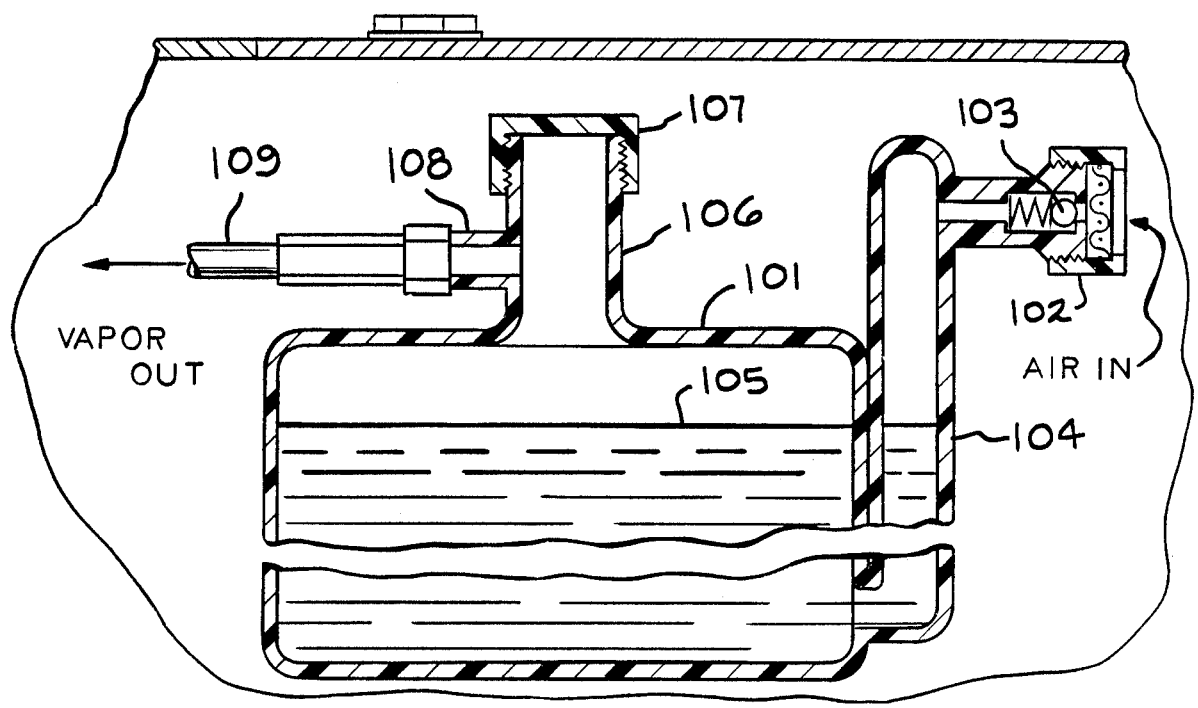
FIG. 3 is a partial sectional schematic view taken on lines 3—3 of FIG. 2 showing the methyl alcohol supply tank assembly.
Figure 2:
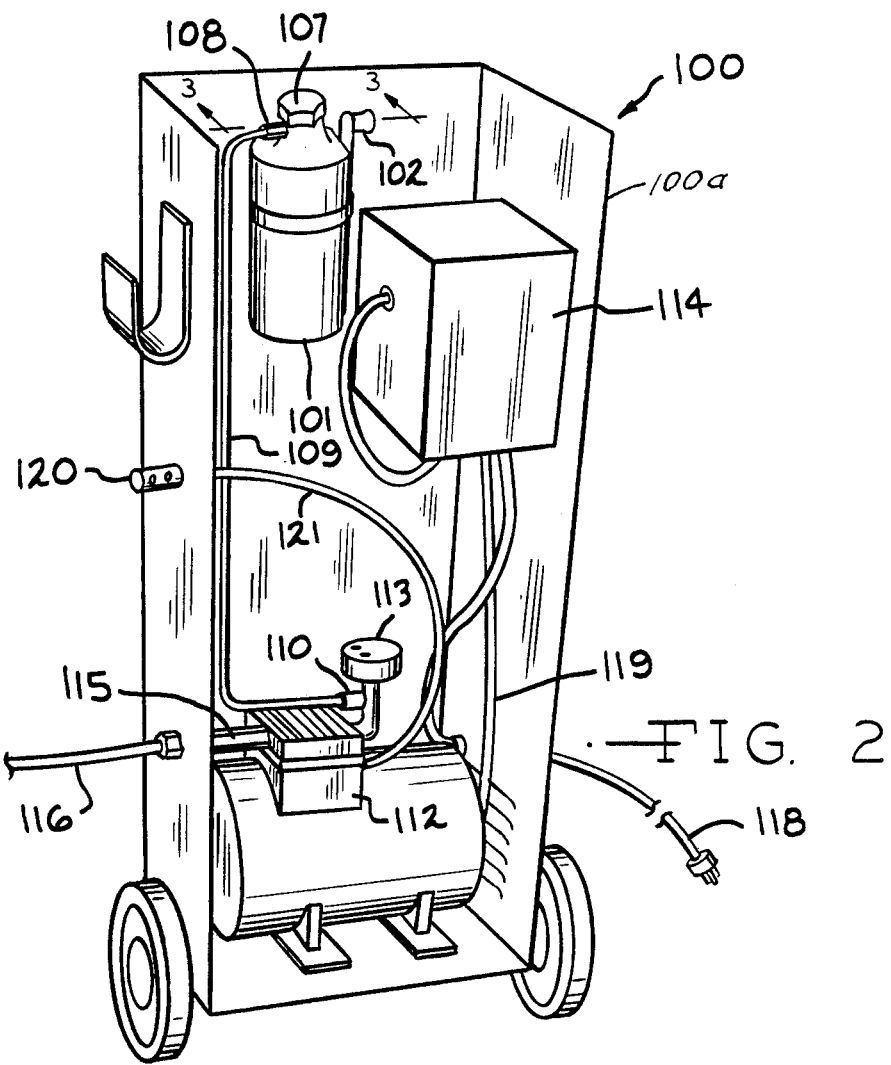
FIG. 2 is a rear perspective view showing the interior components thereof.

As shown in FIGS. 1 and 2, a portable air compressor compressed air delivery unit 100 for tires is provided with a built-in antifreeze capability. The antifreeze capability is achieved by use of a methyl-alcohol supply tank 101. As further shown in greater detail in FIG. 3, the methylalcohol supply tank 101 is provided with an air intake 102 having a spring biased ball check valve 103 incorporated therein to prevent inadvertent escape of methyl alcohol therethrough. The methyl-alcohol tank air inlet tube 104 is vertically positioned along the tank 101 and extends downwardly therealong so as to permit the introduction of outside air into the tank 101 below the surface of the methyl-alcohol 105 contained therein. The methyl-alcohol supply tank 101 is provided with a capped methyl-alcohol supply intake neck opening 106 at the top thereof to permit filling of the tank 101 with methyl-alcohol as required. A cap 107 is provided for threadable engagement with the neck opening 106 to effect selective closure thereof.

A methyl alcohol vapor outlet 108 is provided in the neck 106 which is connected to the methyl-alcohol vapor delivery tube 109 which extends downwardly into operative engagement with the air compressor methyl alcohol vapor intake opening 110 provided on the air compressor air intake tube 111 which extends upwardly from the air compressor 112.

Figure 4:
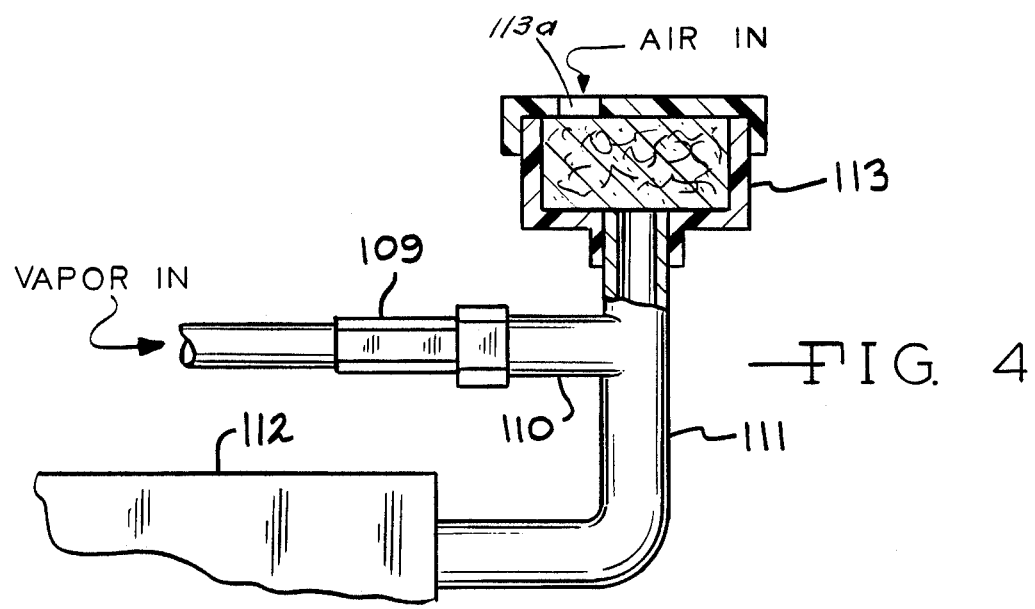
FIG. 4 is a partial schematic side view of the air compressor and methyl alcohol vapor inlet assembly with a portion broken away to show the compressor air intake portion thereof.

As shown in FIG. 4, the vertically oriented air intake tube 111 for the air compressor 112 is provided with a compressor air intake opening assembly 113 having an opening 113a positioned above the methyl-alcohol vapor intake opening 110.

A standard coin-operated timer assembly 114 is provided in the portable compressed air delivery unit 100. When the coin-operated timer assembly 114 is selectively actuated, the air compressor 112 is energized. Thus energized, the air compressor draws in air through the compressor air intake opening 113 and methyl-alcohol vapor from the methyl alcohol tank 101 through the methyl alcohol vapor intake opening 110 so that an air-methyl alcohol vapor mixture is delivered through the compressor intake tube 111 into the air compressor 112.

The compressed air-methyl alcohol vapor mixture is then delivered through the compressor outlet tube 115 into the tire delivery tube 116 for on-demand delivery to a tire through the tire-engaging valve assembly 117.

A power cord 118 is provided for selectively engagement with an electrical power source (not shown) when the portable compressed air delivery unit 100 is moved to its operative use position so as to selectively energize the coin-operated timer assembly 114 and, through the electrical connection 119, the air compressor 112.

Upon actuation of the timer assembly 114 by insertion of a coin therein, the air compressor 112 will begin to operate in the manner described above so as to selectively deliver on demand a compressed air-methyl alcohol vapor mixture through the tire air delivery tube 116 to the tire-engaging valve assembly 117. The presence of the methyl alcohol vapor in the exposed tire air delivery tube 116 will prevent freeze-up of the compressed air vapor condensate remaining in the air delivery tube 116 and in the tire-engaging valve assembly 117 after use.

As a safety feature, an outside pressure relief vent valve 120 is provided in operative engagement with the air compressor 112 through tube 121 so as to selectively relieve compressed air pressures of 100 psi or more that might build up during the operation of the unit.

The basic operation of the coin-operated timer assembly 114 and of the air compressor 112 is well known in the art and will not be described herein.

As previously described, the use of the compressed air-methyl alcohol vapor mixture in the tire delivery tube 116 and in tire-engaging valve assembly 117 prevents freeze-up during operation in below- freezing temperatures.

SUMMARY OF THE INVENTION

In summary, a portable compressed air delivery unit for vehicle tires is provided which has a built-in antifreeze capability. The portable compressed air delivery unit 100 comprises a portable support frame 100a which is provided with an air compressor 112 thereon. The preferred embodiment of the portable unit is provided with wheels, but it is within the scope of the invention to provide a unit without the wheels. The air compressor has a compressor air intake assembly extending upwardly therefrom. The air compressor is provided with a methyl alcohol vapor inlet between the intake opening of the air compressor air intake assembly and the air compressor. The air compressor is also provided with an air compressor compressed air-methyl alcohol vapor mixture outlet. A methyl alcohol supply tank is provided o the frame above the air compressor. The methyl alcohol supply tank is provided with a methyl alcohol supply tank air intake assembly extending upwardly therefrom. The methyl alcohol supply tank air intake assembly is adapted to selectively introduce air into the lower portion of the methyl alcohol supply tank beneath the surface of the methyl alcohol contained in the supply tank. The methyl alcohol supply tank is also provided with a methyl alcohol vapor outlet in the upper portion of the methyl alcohol supply tank. A methyl alcohol vapor delivery tube is provided in operative engagement at one end thereof with the methyl alcohol tank methyl alcohol vapor outlet. The methyl alcohol vapor delivery tube is adapted for operative engagement at the opposite end thereof with the air compressor methyl alcohol vapor inlet so as to provide selective on demand delivery of methyl alcohol vapor to the air compressor. A compressed air-methyl alcohol vapor mixture tire delivery tube is provided in operative engagement at one end thereof with the air compressor compressed air-methyl alcohol vapor mixture outlet. The tire delivery tube is provided with a tire-engaging compressed air valve assembly at the opposite end thereof for selective delivery of compressed air into a vehicle tire. A coin-operated timer assembly is also provided on the frame in operative electrical engagement with the air compressor. The coin operated timer assembly is provided with an external power cord adapted for selective engagement with an external electrical power source. The coin-operated timer assembly is adapted to selectively actuate the air compressor so as to automatically draw methyl alcohol vapor from the methyl alcohol supply tank into the air compressor so as to selectively deliver a compressed air-methyl alcohol vapor mixture to the tire-engaging compressed air valve assembly for selective delivery into a vehicle tire.

A pressure relief valve assembly can also be provided in operative engagement with the air compressor so as to relieve pressures in excess of 100 psi.

It is thus seen that portable compressed air unit is provided which has an automatic built-in antifreeze capability so as to prevent freezing of the compressed air condensate remaining in the tire air delivery tube and in the tire-engaging compressed air valve assembly after use.

From this presentation of an operative embodiment of my invention, improvements, modifications, and substitutions will become apparent to those skilled in the art. Such improvements, modifications, and substitutions are intended to be included within the spirit of the invention limited only by the scope of the hereinafter appended claims.

I claim:

1. In a portable compressed air delivery unit having a built-in antifreeze capability whereby an antifreeze liquid supply tank is adapted to selectively deliver an antifreeze vapor to the air compressor so that a compressed air-antifreeze vapor mixture is delivered from the air compressor to the flexible compressed air outlet tire delivery tube so as to prevent freeze-up of normal compressed air condensation therein during outdoor use in freezing weather, the combination comprising:

a portable support frame;

an air compressor provided on said frame, said air compressor having a compressor air intake assembly extending upwardly therefrom, said air intake assembly having an opening, said air compressor provided with an antifreeze vapor inlet between the opening of said air intake assembly and said air compressor, said air compressor provided with an air compressor compressed air-antifreeze vapor mixture outlet;

an antifreeze liquid supply tank provided on said frame above said air compressor, said antifreeze liquid supply tank having a antifreeze liquid supply tank air intake assembly extending upwardly therefrom, said antifreeze liquid supply tank air intake assembly adapted to selectively introduce air into the lower portion of said antifreeze liquid supply tank beneath the surface of the antifreeze liquid contained in said supply tank, said antifreeze liquid supply tank provided with an antifreeze vapor outlet in the upper portion of said antifreeze liquid supply tank;

an antifreeze vapor delivery tube in operative engagement at one end thereof with said antifreeze tank vapor outlet, said antifreeze vapor delivery tube adapted for operative engagement at the opposite end thereof with said air compressor antifreeze vapor inlet so as to provide selective on demand delivery of antifreeze vapor to said air compressor;

a compressed air-antifreeze vapor mixture tire delivery tube provided in operative engagement at one end thereof with said air compressor compressed air-antifreeze vapor mixture outlet, said tire delivery tube provided with a tire-engaging compressed air valve assembly at the opposite end thereof for selective delivery of compressed air into a vehicle tire; and a coin-operated timer assembly provided on said frame in operative electrical engagement with said air compressor, said coin-operated timer assembly provided with an external power cord adapted for selective engagement with an external electrical power source, said coin-operated timer assembly adapted to selectively actuate said air compressor so as to automatically draw antifreeze vapor from said antifreeze liquid supply tank into said air compressor so as to selectively deliver a compressed air-antifreeze vapor mixture through said tire delivery tube to said tire-engaging compressed air valve assembly for selective delivery to a vehicle tire so as to prevent freeze-up of normal compressed air condensation in said tire delivery tube during outdoor use in freezing weather.

2. In the portable compressed air delivery unit of claim 1 wherein a pressure relief valve assembly is provided in operative engagement with said air compressor.

3. In the portable compressed air delivery unit of claim 1 wherein said frame is provided with support wheels at the base thereof.

4. In the portable compressed air delivery unit of claim 1 wherein said antifreeze liquid comprises methyl alcohol.

* * * * *